(12) United States Patent
Collaro et al.

(10) Patent No.: US 7,849,713 B2
(45) Date of Patent: Dec. 14, 2010

(54) OPTICAL FIBRE HAVING LOW SPLICE LOSS AND METHOD FOR MAKING IT

(75) Inventors: Antonio Collaro, Torre del Greco (IT); Giuseppe Ferri, Cava dei Tirreni (IT); Alfonso Pannullo, Battipaglia (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 1043 days.

(21) Appl. No.: 10/538,899

(22) PCT Filed: Dec. 24, 2002

(86) PCT No.: PCT/EP02/14757

§ 371 (c)(1),
(2), (4) Date: Apr. 5, 2006

(87) PCT Pub. No.: WO2004/059355

PCT Pub. Date: Jul. 15, 2004

(65) Prior Publication Data

US 2007/0003200 A1    Jan. 4, 2007

(51) Int. Cl.
*C03B 37/023* (2006.01)
*C03B 37/07* (2006.01)

(52) U.S. Cl. .......................................... 65/377; 65/381
(58) Field of Classification Search .................. 65/377, 65/381
See application file for complete search history.

(56) References Cited

U.S. PATENT DOCUMENTS

| | | | |
|---|---|---|---|
| 3,823,995 A * | 7/1974 | Carpenter | .................. 385/124 |
| 4,810,276 A | 3/1989 | Gilliland | |
| 6,212,322 B1 | 4/2001 | Ma et al. | |
| 6,247,987 B1 * | 6/2001 | Moore | .......................... 445/24 |
| 6,427,044 B1 | 7/2002 | Yanada et al. | |
| 6,535,677 B1 * | 3/2003 | Tanaka et al. | ................ 385/123 |
| 2001/0046358 A1 | 11/2001 | Sasaoka et al. | |
| 2002/0044755 A1 * | 4/2002 | Li | ............................... 385/127 |

FOREIGN PATENT DOCUMENTS

EP    1 239 312 A1    9/2002

(Continued)

OTHER PUBLICATIONS

Yin et al.; "A New Design for Non-Zero Dispersion-Shifted Fiber (NZ-DSF) with a Large Effective Area Over 100 $\mu m^2$ and Low Bending and Splice Loss"; Optics communications, vol. 177, pp. 225-232, (2000).

(Continued)

*Primary Examiner*—John Hoffmann
(74) *Attorney, Agent, or Firm*—Finnegan, Henderson, Farabow, Garrett & Dunner, L.L.P.

(57) ABSTRACT

A process for making a non-zero dispersion shifted optical fiber having low splice loss and low attenuation and to an optical fiber produced by this process. A reduction of the splice loss is observed with decreasing drawing tension. The optical fiber has a core region that includes three segments and an inner cladding segment, each having a maximum refractive index percent difference, $\Delta delta_i \%$, i=0-3, the subscript $i$ referring to a particular refractive index, the core segments being selected such that $\Delta delta_0\% > \Delta delta_2\% > \Delta delta_1\% \geq 0$ and $\Delta delta_2\% > \Delta delta_3\% \geq 0$. Optical fibers exhibiting low splice loss were drawn at tensions not larger than 150 g, preferably not larger than 100 g.

12 Claims, 5 Drawing Sheets

FOREIGN PATENT DOCUMENTS

| WO | WO-01/49616 A1 | 7/2001 |
| WO | WO-02/051762 A1 | 7/2002 |

OTHER PUBLICATIONS

Adcox et al.; "Splicing and Fiber Assembly Compatibility for Non-Zero Dispersion-Shifted Fiber and Standard Single-Mode Fiber"; Presenter at NOC/EC 2000, pp. 1-7, (2000).

White et al.; "Splice Loss in Non-Zero Dispersion-Shifted Fibers"; IWCS proceedings, pp. 891-896, (1998).

Tajima; Low-Loss Optical Fibers Realized by Reduction of Rayleigh Scattering Loss; OFC '98 Technical Digest, pp. 305-306, (1998).

Office Action from the Canadian Intellectual Property Office dated May 10, 2010, in counterpart Canadian patent application No. 2,509,263 (3 pages).

\* cited by examiner

PRIOR ART

OPTICAL FIBRE HAVING LOW SPLICE LOSS AND METHOD FOR MAKING IT

CROSS REFERENCE TO RELATED APPLICATION

This application is a national phase application based on PCT/EP2002/014757, filed Dec. 24, 2002, the content of which is incorporated herein by reference.

BACKGROUND OF THE INVENTION

Description of the Related Art

Present long-haul communication links make generally use of wavelength division multiplexing (WDM) and zero dispersion or low dispersion fibres to increase capacity and to extend distances between signal regeneration. However, the use of zero- or low-dispersion transmission fibres in WDM systems can result in severe performance degradation due to non linear phenomena, such as four-wave mixing (FWM). In order to minimise FWM the zero-dispersion wavelength should be located out of the transmission bands, normally the C-band (1530-1565 nm) and/or the L-band (1565-1620 nm). The resulting fibres with a controlled amount of dispersion and low attenuation in the transmission band are called non-zero dispersion-shifted (NZD) fibres, specified in ITU-T Recommendation G.655. Examples of commercial NZD fibres are the TrueWave® (trademark of Lucent), LEAF® and MetroCor® (trademarks of Corning), and FreeLight® (trademark of Pirelli).

NZD fibres with large effective area, i.e., with effective area larger than about 50 $\mu m^2$, such as LEAF® and Freelight® fibres, have the potential to carry signals with high optical power while reducing the non-linear optical effects. Large effective area fibres are therefore good candidates for high-capacity WDM networks over long distances.

An optical fibre having a segmented core can provide a large effective area while limiting the non-linear optical effects. U.S. patent application Ser. No. 2002/0044755 discloses a single-mode optical fibre having a relatively large effective area, greater than 45 $\mu m^2$, together with a substantially flat dispersion slope over the operating range. The disclosed fibre includes a segmented core index profile.

U.S. Pat. No. 6,212,322 discloses an optical fibre having a segmented core index profile, positive total dispersion at 1530 nm and effective area larger than 60 $\mu m^2$.

In optical systems, such as long-haul communication links, optical fibres normally need to be joined together to make a continuous optical path for light transmission from one fibre length to another. Often, the joined optical fibres are of different type, such as in the case of an optical path in which a transmission fibre is coupled to a dispersion-compensating fibre. Also, the end of the fibre needs to be connected to terminations, such as repeaters, data transmitters or power meters. Joining of two fibres or two groups of fibres is generally referred to as splice. When two optical fibres are spliced, a loss in optical power across the splice point, i.e., a splice loss, may occur. Splicing together two different types of fibres, i.e., hybrid splicing, may lead to an elevated splice loss due to mode field diameter (MFD) and fibre geometry mismatch. Even when splicing two different lengths of the same fibre, i.e., homogeneous splicing, optical power can be lost across the splice because of misalignment of the fibre cores and of intrinsic parameters of the fibres such as the core/clad concentricity or fibre curl.

Fibre curl is the inherent curvature over a specific length of uncoated fibre and is measured by rotating an unsupported fibre end about the fibre's axis and by measuring the deflection from horizontal. Fibre deflection, typically measured in microns, is converted to radius of curvature, usually expressed in meters. Fibre curl is believed to be an important parameter for splice performance, together with the core/clad concentricity, which defines how well the core is centred in the cladding glass region, and the cladding diameter.

A number of techniques have been developed over the years to limit the detrimental effects of splice loss. Two commonly used techniques are fusion splicing, which involves the melting together of fibre ends, and mechanical splicing, which makes use of a mechanical coupling device to hold the fibre ends together. Permanent joining of single-mode optical fibres is typically performed by fusion splicing.

NZD fibres are typically fabricated with more complex refractive index profiles (RIPs) than standard single mode fibres. The RIP describes the variation of glass refractive index along the optical fibre radius. Due to their more complex physical design, NZD fibres are believed to be more effected by critical parameters such as splicing conditions and procedures. M. Adcox in "*Splicing and fiber assembly compatibility for non-zero dispersion-shifted fiber and standard single-mode fiber*", presented at NOC/EC 2000, describes splice studies for single-mode fibre and NZD fibres by using an active alignment splicer. Splice loss is said to be more sensitive to cleave end angle when splicing a NZD fibre compared to standard single-mode fibre. M. E. White and S. A. Cooper in "*Splice loss in non-zero dispersion-shifted fibres*", published in the IWCS proceedings, p. 891 (1998), report splice loss studies for LEAF ® fibres manufactured by Corning with MFD between 9.48 and 9.92 $\mu m$. LEAF® fibre are said to provide lower loss splices with active alignment systems than other NZD fibre designs.

A designed NZD fibre with large effective area and low splice loss is presented in "*A new design for non-zero dispersion-shifted fiber (NZ-DSF) with a large area over 100 $\mu m^2$ and low bending and splice loss*" by S. Yin et al, Optics Communications 177 (2000), p. 225. Calculations of splice loss are reported for a splice with conventional single mode fibre.

Minimisation of signal attenuation in the transmission band as light travels along the optical fibre is one of the crucial issues in the design and in the manufacturing of optical fibres. Absorption and Rayleigh scattering are the two major causes of signal loss. Transmission loss is greatly influenced by the tension applied to the optical fibre when making the optical fibre by drawing an optical fibre preform upon heating. During drawing, the preform is heated at the optimum temperature to achieve the desired drawing tension.

Tajima K. in "*Low loss optical fibers realized by reduction of Rayleigh scattering loss*", OFC '98 Technical Digest, p. 305, reports an increase of the Rayleigh scattering coefficient with increasing the drawing temperature in $GeO_2$—$SiO_2$ core single-mode fibres. The Rayleigh scattering coefficient of at relatively low temperature, i.e., 1800° C., and without increasing the tension was found to be of 0.78 dB/km·$\mu m^4$.

U.S. Pat. No. 6,427,044 discloses an optical fibre comprising a Ge-doped core whose maximum value of the relative refractive index, $\Delta_{max}$, is not less than 0.8%. In case of an optical fibre in which the core is doped with high concentration of $GeO_2$, the increase of Rayleigh scattering loss due to $GeO_2$ doping can become problematic. A decrease in transmission loss is reported as the drawing tension increases from 13 to 28.5 $kg/mm^2$ for segmented-core optical fibres having $\Delta_{max}$ of 1.5% and of 2.5%. In order to reduce loss due to GeO$_2$ doping, it is suggested that the drawing tension should be increased.

U.S. patent application Ser. No. 2001/0046358 discloses a segmented-core optical fibre with a F-doped core segment and F-doped cladding region, which comprises first and second portions having positive and negative chromatic dispersions, respectively, disposed alternately in the longitudinal direction for dispersion management. Positive and negative dispersion portions are achieved by changing the drawing tension in the longitudinal direction from 90 g to 40 g.

SUMMARY OF THE INVENTION

The difference in refractive index between core and cladding of the optical fibre, which is produced by doping with GeO$_2$ or other index-raising dopants, may induce internal stress due to the radial variation of thermal expansion coefficient caused by compositional variation in the fibre. Internal stress is also built in optical fibres during the drawing process because of the viscosity mismatch between the core and the cladding. The internal stress is frozen-in in the optical fibre after cooling and may induce a permanent change in the final refractive index. The internal stress due to viscosity mismatch is proportional to the applied drawing tension.

Small variations in process conditions during manufacturing of optical fibres within product specifications result in produced fibres having physical and geometrical parameters that may vary within a given range. Thus, the splicing of two fibres in product specification may be affected by geometry or MFD mismatch. This type of splicing will be referred to as hybrid splicing, as for the splicing of different types of fibres.

Splicing methods for permanent splices, such as fusion splicing, generally involve heating of the fibre ends, which will be joined together, up to temperatures which are high enough to soften the glass and allow the glass to flow. Inventors have observed that heating may induce a modification of the RIP of the fibre in the region close to the splice point, i.e., in the region affected by the heating. They have found that drastic modifications of the RIP after splicing were present in optical fibres that had been drawn at relatively high tensions. Conversely, fibres drawn at relatively low tensions exhibited a reduced RIP change after splicing.

Inventors presume that the frozen-in stress of the optical fibre in the region close to the splice point is at least partially relieved during heating, thereby leading to a RIP change after fusion splicing. As the RIP change is local, i.e., in the fibre length portion close to the splice point, the spliced fibre will result optically inhomogeneous due to the difference in RIP along the fibre, thereby inducing optical losses because of internal light reflection or diffusion. Inventors suppose that a relatively low drawing tension reduces the frozen-in stress in the fibre and thus limits the RIP change after splicing.

In order to reduce splice losses in an optical fibre, inventors have found that the drawing tension should be not larger than 150 g, preferably not more 100 g. In the most preferred embodiment, the drawing tension is comprised between 60 and 100 g.

The optical fibre of the present invention has a core region and an outer cladding region, wherein the core region has a RIP of the segmented core type, each segment having a particular refractive index profile. The core RIP comprises three core segments and an inner cladding segment. In particular, the fibre core comprises a central segment, a first annular segment adjacent to the central segment, a second annular segment adjacent to the first annular segment, and an inner cladding segment surrounding the second annular segment.

The refractive index percent difference of the i-th segment relative to the outer cladding region, i.e., the index delta $\Delta_i$%, is defined herein by the equation $$\Delta_i\% = 100 \times \frac{n_i - n_c}{n_c}, \quad (1)$$

where $n_i$ is the maximum refractive index of the i-th segment and $n_c$ is the refractive index of the reference region, which is taken as the uniform outer cladding region, made typically of substantially undoped silica glass. A segment of known shape, e.g., a Gaussian-type segment or step-index segment, can be characterised by its index delta, and, if necessary, by one or more other parameters, such as the centre radius or the curve width. Generally, each point of a segment has an associated relative refractive index.

Each of the core segments has a non negative relative refractive index, the index delta of the central segment, $\Delta_0$%, being larger than the relative index of the other segments. Therefore, the index delta $\Delta_0$% corresponds to the maximum relative index $\Delta_{max}$ % of the fibre. The index delta of the second annular segment, $\Delta_2$%, is larger than the index delta of the first annular segment, $\Delta_1$ %. The relations among the index delta's of the core segments are:

$$\Delta_0\% > \Delta_2\% > \Delta_1\% \geq 0,$$

$$\Delta_2\% > \Delta_3\% \geq 0,$$

where $\Delta_3$% is the index delta of the inner cladding segment.

Whereas splice loss has been found by the inventors to be strongly related to the drawing tension, other important optical properties such as the signal attenuation along the fibre also depend on the tension. Inventors have become aware that in order to achieve low signal attenuation, the maximum positive difference in the refractive index between the core and the cladding, i.e., the maximum relative index, $\Delta_{max}$ %, should be lower than a certain value that depends on the drawing tension. They have found that $\Delta_{max}$ % should be not more than about 0.84% for optical fibres drawn at tensions not larger than 200 g and not more than about 0.80% for tensions not exceeding 150 g. For drawing tensions not larger than 100 g, $\Delta_{max}$ % should be preferably not more than about 0.73%. In particular, for drawing tensions within the range of about 150-200 g, $\Delta_{max}$ % should be preferably from about 0.80% to 0.84%; for drawing tensions within the range of about 100-150 g, $\Delta_{max}$ % should be preferably from about 0.73% to 0.80%, and for drawing tensions in the range from about 60 g to 100 g, $\Delta_{max}$ % should be preferably from about 0.64% to 0.73%.

Core parameters of the optical fibre of the present invention are preferably selected so as to obtain a NZD fibre having zero dispersion wavelength, $\lambda_0$, comprised between about 1430 and 1510 nm. Inventors have recognised that in order to obtain a segmented core NZD optical fibre drawn at tensions not larger than 200 g, the central segment should have relative index $\Delta_0$% within the range from about 0.64% to 0.84% and the centre radius and the width of the second annular segment should be within the range of about 5.5-7.5 μm and of 1.7-3.0 μm, respectively. Preferably, for optical fibres drawn at tensions not larger than 150 g, the centre radius of the external ring should be in the range from about 6.7 to 7.5 μm.

For drawing tensions not larger than 100 g, $\Delta_0$% should be preferably within the range from about 0.64% to 0.73%. More preferably, for fibres drawn at tensions not larger than 100 g, the centre radius of the external ring should be within the range from about 7.1 to 7.5 μm.

A reduction of the drawing tension normally implies the increase of the furnace temperature to temperatures of typically more than 1900° C. Inventors have recognised that a relatively high drawing temperature may lead to an increase of structural defects in the optical fibre material, such as non-bridging oxygen centres and peroxy radical defects. Hydrogen penetrating the optical fibre can react with these defects and create hydroxil groups which are detrimental to the optical fibre performance.

Inventors have noted that it is advantageous to dope the inner cladding of the optical fibre with a relative low concentration of germanium, with index delta $\Delta_3\%$ comprised between 0.02% and 0.04%, so as to reduce the hydrogen permeability of the optical fibre. More preferably, the relative index of the inner cladding ranges from about 0.021% to 0.027%.

Optical fibre preforms are drawn preferably at a speed comprised between about 9 to about 16 m/s.

In a preferred embodiment, the optical fibre comprises
a central segment with relative index, $\Delta_0\%$, in the range 0.64% and 0.80%, centre radius between 5.5 μm to 7.5 μm and width at half height $w_0$ from 3.5 μm to 4.3 μm, a first annular segment of index delta $\Delta_1\%$ not larger than about 0.1% value, preferably not more than 0.07%, a second annular segment having relative index, $\Delta_2\%$, ranging from 0.11% to 0.17%, a centre radius $r_2$ from 5.5 to 7.5 μm, and a width at half height, $w_2$, from about 1.7 to about 3.0 μm, an inner cladding segment of index delta $\Delta_3\% \geqq 0$.

In a subset of this embodiment, the external ring has an alpha profile. The preferred alpha profile is that where α ranges from about 4 to about 7.

In another subset of this embodiment, the fibre core comprises an inner cladding segment adjacent to the second annular segment having a positive index delta, $\Delta_3\%$, comprised between 0.02% and 0.04%, preferably between 0.021% and 0.027%.

This core structure provides an optical fibre having positive chromatic dispersion D at 1550 nm of the fibre within the range 2.0 to 8.5 ps/nm/km, and dispersion slope S at 1550 nm ranges from 0.075 to less than 0.1 ps/nm$^2$/km. Preferably, RIPs are selected to provide an effective area, $A_{eff}$, from about 60 to 90 μm$^2$. Zero dispersion is preferably within the range from about 1430 to 1510 nm.

DETAILED DESCRIPTION

The optical fibre was drawn from a preform blank. The optical fibre preform was produced preferably by outside vapour deposition (OVD). In first stage, glass particles were deposited on a rotating cylindrical mandrel, preferable made of ceramic material, such as alumina. Glass particles mainly comprised silicon oxide ($SiO_2$) doped with other compounds, such as germanium oxide ($GeO_2$), which modify the refractive index of $SiO_2$. Reactants flow was varied during deposition, e.g., by changing the concentration or the type of dopant, so as to obtain the desired RIP. The mandrel was then removed, leaving a central hole in the soot preform. The soot preform was dehydrated and then sintered to obtain a consolidated core blank which will ultimately form the core and the inner portion of the cladding, hereafter referred to as the inner cladding, of the optical fibre. Dehydration was carried out in an inert gas atmosphere comprising $Cl_2$ to eliminate hydroxide ions or water molecules from the soot preform. The consolidated core blank having a central hole of smaller diameter than that of the hole after removal of the mandrel was placed in a furnace to melt one of its lower ends. During heating of the consolidated core blank, the central hole was evacuated, thereby causing its walls to collapse, in a similar process as that described in U.S. Pat. No. 4,810,276. The fused glass material cooled off forming a cylindrical elongated member which was stretched downwards by a traction device, preferably of the type described in WO 01/49616. The elongated member produced by the stretching was cut into a plurality of rods, which will be referred to as the core rods. Each core rod served as a substrate for the chemical deposition of the glass soot which ultimately formed the overcladding or outer cladding. This deposition process comprised depositing on the core rod glass particles, mainly comprising $SiO_2$, so as to obtain a soot preform. The soot preform was dehydrated and consolidated in a similar process as that carried out for the vitrification of the core soot preform. The preform was subsequently drawn to form the optical fibre.

Although in a preferred embodiment, preform production was carried out by OVD process, it is to be understood that the invention is not limited to preforms manufactured by the OVD process. The preform can be also made by vapour axial deposition (VAD), modified chemical vapour deposition (MCVD), rod-in-tube method or other methods.

Figure 1:
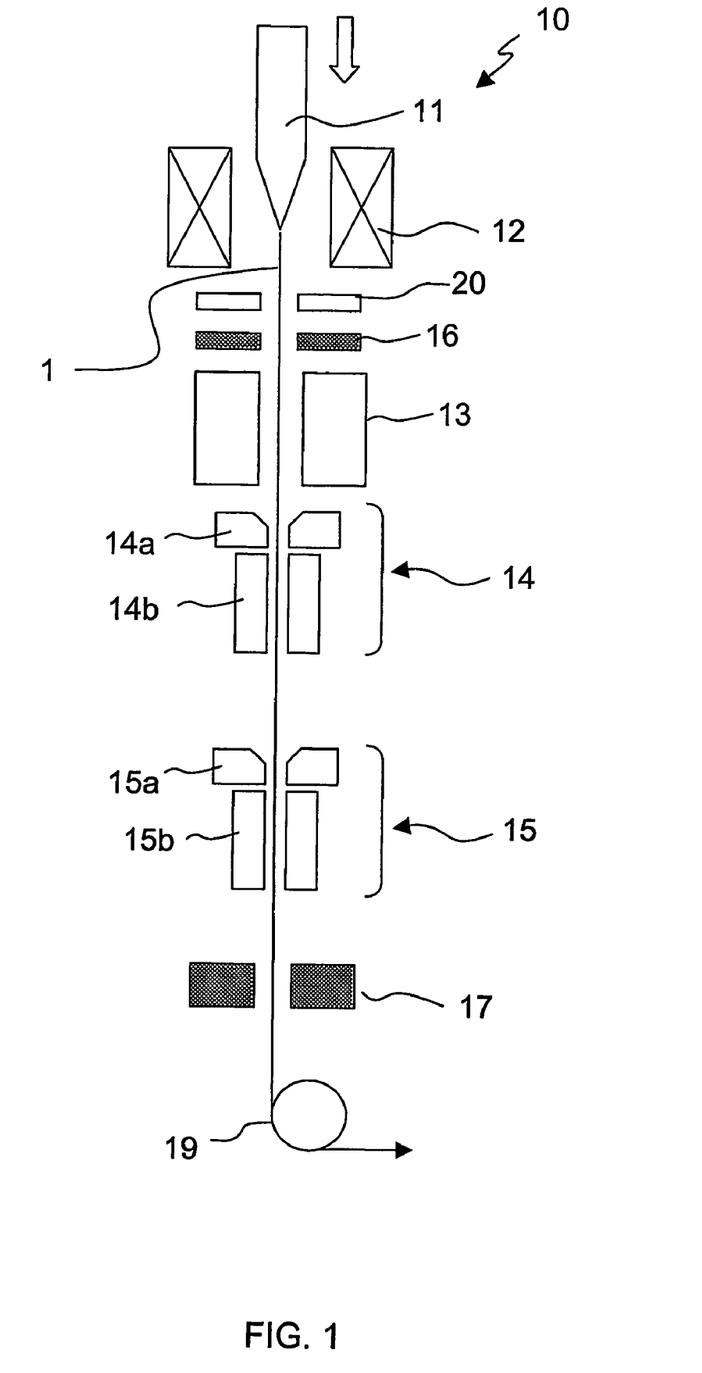
FIG. 1 is a schematic diagram illustrating a fibre drawing system according to an embodiment of the present invention.

FIG. 1 illustrates an exemplary optical fibre drawing tower (10) for making an optical fibre according to the present invention. A preform blank 11 was loaded into a furnace 12, for example a graphite furnace, kept at a given temperature. A cooler 13 was placed underneath the furnace for cooling the optical fibre. The cooler can be for example a cylindrical cooler in which a cooling gas, such as helium, flowed onto the fibre. A diameter sensor 20 may be provided below the furnace for continuos monitoring of the outer fibre diameter. Typical fibre diameter was of about 125 μm. The fibre was then coated with a first coating layer by means of a coating unit 14 that comprised a resevoir 14a containing the coating die, for example an urethane-acrylate material, and a curing unit 14b, for example an UV-ray oven for cross-linking the coating die. An optional second coating unit 15 including a resevoir 15a and a curing unit 15b provided a secondary coating layer on the fibre. A tractor mechanism 19 was located downstream of the coating units. The tractor mechanism pulled the fibre from the heated preform blank and the fibre was wound onto a spool (not shown). A tension meter 16 was preferably placed beneath the drawing furnace to measure the tension of the bare fibre. A spinning apparatus 17 for spinning the optical fibre can be optionally placed after the coating units.

Drawing conditions are determined to a large extent by the temperature of the furnace, the drawing tension and the fibre drawing speed. In order to control drawing conditions, feedback loops between the furnace temperature and the tension or the drawing speed can be implemented by using for example the tension meter and/or the diameter meter and a pyrometer inside the furnace.

The optical fibre of the invention is of NZD type with $\lambda_0$ preferably comprised between about 1430 and 1510 nm. The optical fibre is designed to have an attenuation low enough to allow long-haul communication by drawing the fibre at tensions not larger than 150 g. Preferably, the optical fibre should exhibit low attenuation and good optical performance with drawing tensions of not more than 100 g. The RIP is of type segmented-core and comprises three core segments and an inner cladding segment. All segments have non-negative relative index and the central segment has a relative index $\Delta_0\%$ which is larger than the relative index of the other segments, and thus corresponds to the maximum relative index $\Delta_{max}\%$.

Figure 2:
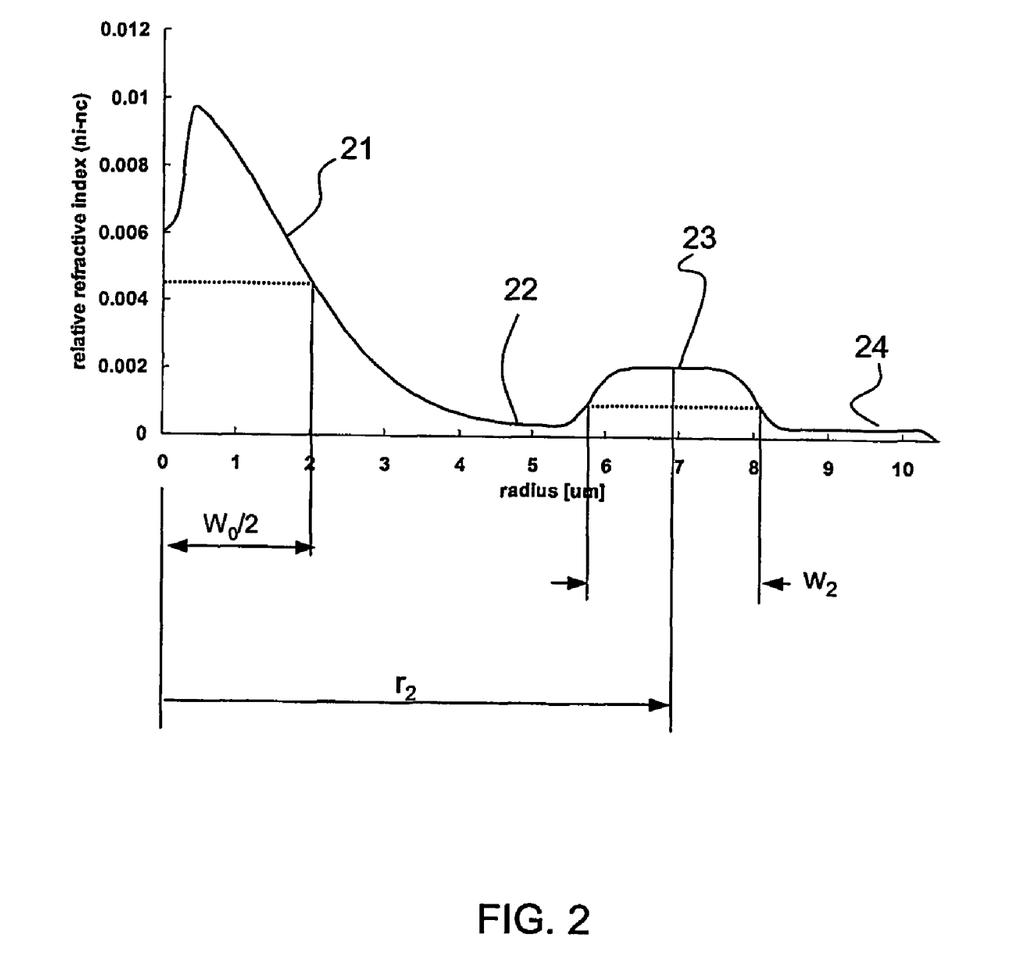
FIG. 2 is a diagram of the refractive index profile (RIP) of a segmented-core optical fibre according to a preferred embodiment of the present invention.

The diagram of FIG. 2 illustrated the RIP of a group of profiles according to the present invention. The RIP comprises three segments 21, 22, and 23 and an inner cladding 24. The RIP may be expressed by the equation, $$\Delta n(r)\% = \Delta_0\% \cdot \exp\left(-\frac{1}{2}\left(\frac{r}{\sigma_0}\right)^2\right) + \Delta_2\% \cdot \exp\left(-\frac{1}{2}\left|\frac{r-r_2}{\sigma_2}\right|^\alpha\right) + \Delta_3\% \cdot U(r-r_3), \quad (2)$$

where $\Delta_0\%$, $\Delta_2\%$, and $\Delta_3\%$, are the relative indices of the central segment, centred nearly at the core centreline ($r_0 \cong 0$), the second annular segment, i.e., the external ring, and the inner cladding, respectively. $U(r-r_3)$ is a unitary function that is equal to unity for $r \geq r_3$, with r extending practically to the outer edge of the core rod (in the example of FIG. 2 the outer edge is of 10.5 μm), and to zero for $r<r_3$, where $r_3$ is the inner radius of the inner cladding and approximately corresponds to the outer radius of the external ring $r_2+\sigma_2$. The central segment was modelled with a Gaussian, whereas the second annular segment was modelled with a super-Gaussian of order α larger than 2. Radius $r_2$ is the centre or mean radius of the external ring; $\sigma_0$ and $\sigma_2$ are the spreads of the curves relative to the central segment and the external ring, respectively. For this type of RIPs, $\Delta_1\%$ is kept not larger than 0.1%, preferably not larger than 0.07%. From the profile modelling, it appeared that $\Delta_1\%$, if kept within the given ranges, did not significantly influence the profile. Therefore, small negative values of $\Delta_1\%$ are not expected to influence the fibre properties.

The central segment 21 has a relative index, $\Delta_0\%$, within the range of about 0.64% to about 0.80% and a peak width $w_0=2\sigma_0\sqrt{2\ln 2}$ calculated at half height which is comprised from about 3.5 μm to about 4.3 μm. Although the central segment was modelled by a Gaussian, it is to be understood that small variations in the profile shape of the segment would not significantly influence the properties of the resulting fibre. For instance, a triangular-shaped central segment having suitable index delta and width could be used instead.

The first annular segment 22, adjacent to the central segment 20, has non negative relative index $\Delta_1\%$ not larger than 0.1%, preferably not larger than 0.07%. The second annular segment 23, adjacent to the first annular segment, also referred herein to as the external ring, has a relative index $\Delta_2\%$ within the range of about 0.11% to about 0.17%, while its radius $r_2$ ranges from about 5.5 μm to 7.5 μm. The external ring was modelled with a super-Gaussian having an α ranging from about 4 to 7. The width of the external ring, $w_2=2\sigma_2(2\ln 2)^{1/\alpha}$ calculated at the half height, is of about 1.7 μm to about 3.0 μm for α in the range 4-7. Curve spread $\sigma_2$ of the external ring is from about 0.8 to about 1.4 μm.

It is to be understood that small variations in the profile shape of the external ring will not notably affect the fibre properties. For instance, the external ring could be modelled by a step-like profile.

The inner cladding segment 24 has an index delta $\Delta_3\%$ such that $\Delta_2\% > \Delta_3\% \geq 0$. Preferably, the inner cladding segment 24 has an index delta $\Delta_3\%$ such that ranges from about 0.02% to 0.04%, more preferably from 0.021 to 0.027%. The raised inner cladding region can be included in the core design to reduce the permeability of the fibre to hydrogen. Preferably, the width of the inner cladding, taken as the difference between the outer radius of the inner cladding and outer radius of the external ring $r_2+\sigma_2$, is comprised in the range of about 2-4 μm. It is to be understood that small deviations from a step-like shaped inner cladding will not modify the optical properties of the resulting fibre. For example, a slightly curved step profile could be envisaged for the inner cladding segment.

A dip in the index profile may be present at the centreline of the fibre core, the dip being at least partially due to the diffusion of dopants occurring mostly during dehydration and consolidation processes.

The RIP of FIG. 2 was obtained by doping the $SiO_2$ glass with different amounts of germanium to raise the refractive index of the core and the inner cladding.

Table 1 reports the optical properties, calculated using a computer model, of an optical fibre having the profile parameters according to FIG. 2.

TABLE 1

| | |
|---|---|
| Dispersion at 1550 nm (ps/nm · km) | 2.0-8.5 |
| Dispersion slope at 1550 nm (ps/nm² · km) | <0.1 |
| Zero dispersion wavelength (nm) | 1430-1510 |
| Mode field diameter at 1550 nm (μm) | 9.0-10.5 |
| Effective area at 1550 nm (μm²) | 60-90 |
| Cable cut-off wavelength (nm) | <1450 |
| Attenuation at 1550 nm (dB/km) | <0.225 |

Optical fibres manufactured with a RIP shape exhibited on average a good hydrogen resistance, as demonstrated by testing hydrogen ageing loss.

Bending performance of optical fibres was estimated by calculating microbending according to the IEC standard 62221 TR3 Ed. 1, Method A. Microbending of the optical fibres according to the invention was not larger than 10 (dB/km)/(g/mm).

EXAMPLE 1

An optical fibre was modelled using the profile shape illustrated in FIG. 2. The index profile parameters were the following: $\Delta_0\%=0.71\%$, $w_0=3.90$ μm, $\Delta_2\%=0.12\%$, $r_2=7.21$ μm, $w_2=2.21$ μm, $\alpha=6$, and $\Delta_3\%=0.021\%$. The RIP is compatible with a drawing tension of about 90 g. The optical properties of a fibre having this profile are given in Table 2.

TABLE 2

| | |
|---|---|
| Dispersion at 1550 nm (ps/nm · km) | 5.5 |
| Dispersion slope at 1550 nm (ps/nm² · km) | 0.073 |
| Zero dispersion wavelength (nm) | 1476 |
| Mode field diameter at 1550 nm (μm) | 9.5 |
| Effective area (μm²) | 71 |
| Cable cut-off wavelength | 1230 |
| Microbending at 1550 nm (Db/km)/(g/mm) | 5 |

EXAMPLE 2

An optical fibre was modelled using the profile shape illustrated in FIG. 2. The index profile parameters were the following: $\Delta_0\%=0.64\%$, $w_0=4.05\ \mu m$, $\Delta_2\%=0.12\%$, $r_2=7.21\ \mu m$, $w_2=2.21\ \mu m$, $\alpha=6$, and $\Delta_3\%=0.021\%$. The RIP is compatible for a drawing tension of about 90 g. The optical properties of a fibre having this profile are given in Table 3.

TABLE 3

| | |
|---|---|
| Dispersion at 1550 nm (ps/nm · km) | 7.2 |
| Dispersion slope at 1550 nm (ps/nm² · km) | 0.075 |
| Zero dispersion wavelength (nm) | 1457 |
| Mode field diameter at 1550 nm (μm) | 10.1 |
| Effective area (μm²) | 81 |
| Cable cut-off wavelength | 1230 |
| Microbending at 1550 nm (dB/km)/(g/mm) | 10 |

EXAMPLE 3

An optical fibre was modelled using the profile shape illustrated in FIG. 2. The index profile parameters were the following: $\Delta_0\%=0.71\%$, $w_0=3.90\ \mu m$, $\Delta_2\%=0.12\%$, $r_2=7.21\ \mu m$, $w_2=2.27\ \mu m$, $\alpha=4$, and $\Delta3\%=0.021\%$. This profile is compatible for a drawing tension of about 90 g. The optical properties of a fibre having this profile are given in Table 4.

TABLE 4

| | |
|---|---|
| Dispersion at 1550 nm (ps/nm · km) | 5.5 |
| Dispersion slope at 1550 nm (ps/nm² · km) | 0.073 |
| Zero dispersion wavelength (nm) | 1477 |
| Mode field diameter at 1550 nm (μm) | 9.5 |
| Effective area (μm²) | 71 |
| Cable cut-off wavelength | 1240 |
| Microbending at 1550 nm (dB/km)/(g/mm) | 6 |

EXAMPLE 4

An optical fibre was modelled using the profile shape illustrated in FIG. 2. The index profile parameters were the following: $\Delta_0\%=0.77\%$, $w_0=3.67\ \mu m$, $\Delta_2\%=0.13\%$, $r_2=6.71\ \mu m$, $w_2=2.21\ \mu m$, $\alpha=6$, and $\Delta_3\%=0.021\%$. This profile is suitable for a drawing tension of about 150 g. The optical properties of an optical fibre having this profile are given in Table 5.

TABLE 5

| | |
|---|---|
| Dispersion at 1550 nm (ps/nm · km) | 4.0 |
| Dispersion slope at 1550 nm (ps/nm² · km) | 0.076 |
| Zero dispersion wavelength (nm) | 1498 |
| Mode field diameter at 1550 nm (μm) | 9.25 |
| Effective area (μm²) | 68 |
| Cable cut-off wavelength | 1235 |
| Microbending at 1550 nm (dB/km)/(g/mm) | 4 |

EXAMPLE 5

An optical fibre was modelled using the profile shape illustrated in FIG. 2. The index profile parameters were the following: $\Delta_0\%=0.73\%$, $w_0=3.67\ \mu m$, $\Delta_2\%=0.13\%$, $r_2=6.71\ \mu m$, $w_2=2.21\ \mu m$, $\alpha=6$, and $\Delta_3\%=0.021\%$. The profile of this example is suitable for a drawing tension of about 90 g. The optical properties of an optical fibre having this profile are given in Table 6.

TABLE 6

| | |
|---|---|
| Dispersion at 1550 nm (ps/nm · km) | 4.1 |
| Dispersion slope at 1550 nm (ps/nm² · km) | 0.076 |
| Zero dispersion wavelength (nm) | 1496 |
| Mode field diameter at 1550 nm (μm) | 9.5 |
| Effective area (μm²) | 71 |
| Cable cut-off wavelength | 1200 |
| Microbending at 1550 nm (dB/km)/(g/mm) | 5 |

EXAMPLE 6

An optical fibre was modelled using the profile shape illustrated in FIG. 2. The index profile parameters were the following: $\Delta_0\%=0.81\%$, $w_0=3.63\ \mu m$, $\Delta_2\%=0.14\%$, $r_2=5.92\ \mu m$, $w_2=2.63\ \mu m$, $\alpha=6$, and $\Delta_3\%=0.021\%$. This profile is suitable for a drawing tension of about 200 g. The optical properties of an optical fibre having this profile are given in Table 7.

TABLE 7

| | |
|---|---|
| Dispersion at 1550 nm (ps/nm · km) | 4.9 |
| Dispersion slope at 1550 nm (ps/nm² · km) | 0.08 |
| Zero dispersion wavelength (nm) | 1489 |
| Mode field diameter at 1550 nm (μm) | 9.2 |
| Effective area (μm²) | 6.7 |
| Cable cut-off wavelength | 1280 |
| Microbending at 1550 nm (dB/km)/(g/mm) | 4 |

COMPARATIVE EXAMPLE

Figure 3:
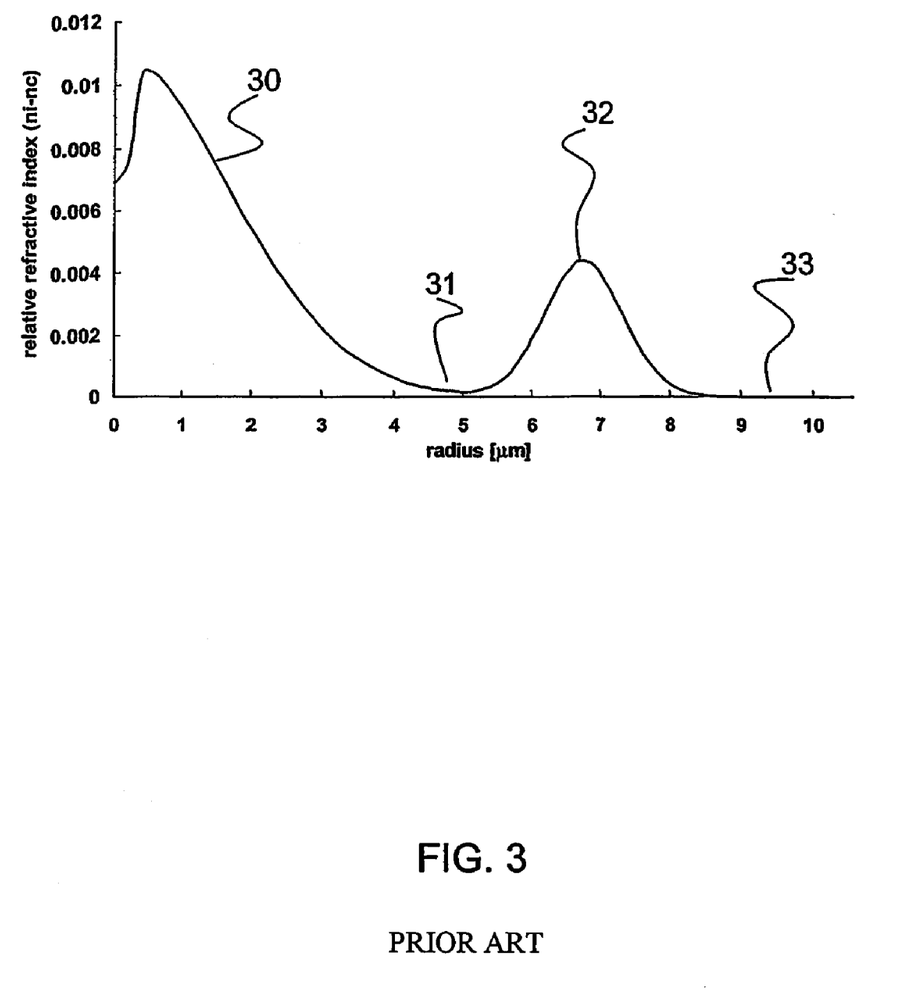
FIG. 3 is a diagram of the RIP of a known segmented-core optical fibre.

The diagram of FIG. 3 illustrates the RIP of a known optical fibre having an index profile of segmented core type. The core index profile includes three segments, a central segment 30, a first annular segment 31 and a second annular segment 32, and an inner cladding region 33. The central segment 30 has a relative refractive index $\Delta_0\%$ of 0.76% and a full width $w_0$, estimated at the half height, of about 3.96 μm. The second annular segment 32 has a relative index $\Delta_2\%$ of about 0.32% centred at $r_2$ of about 6.5 μm. The width $w_2$ of the external ring, calculated at the half height, is of about 1.5 μm. The inner cladding region 33 has a refractive index which is approximately identical to that of undoped $SiO_2$, i.e., that of the outer cladding.

Optical fibres with parameters centred around the values given above are considered as comparative example. The optical properties of these optical fibres are given in Table 8.

TABLE 8

| | |
|---|---|
| Dispersion at 1550 nm (nm/ps/km) | 3.2-7.7 |
| Mode field diameter at 1550 nm (μm) | 9.1-10.0 |
| Cable cut-off wavelength (nm) | <1400 |
| Average core/cladding concentricity (μm) | 0.23 |
| Average curl (m) | 23 |
| Attenuation at 1550 nm (dB/km) | <0.225 |

Figure 4:
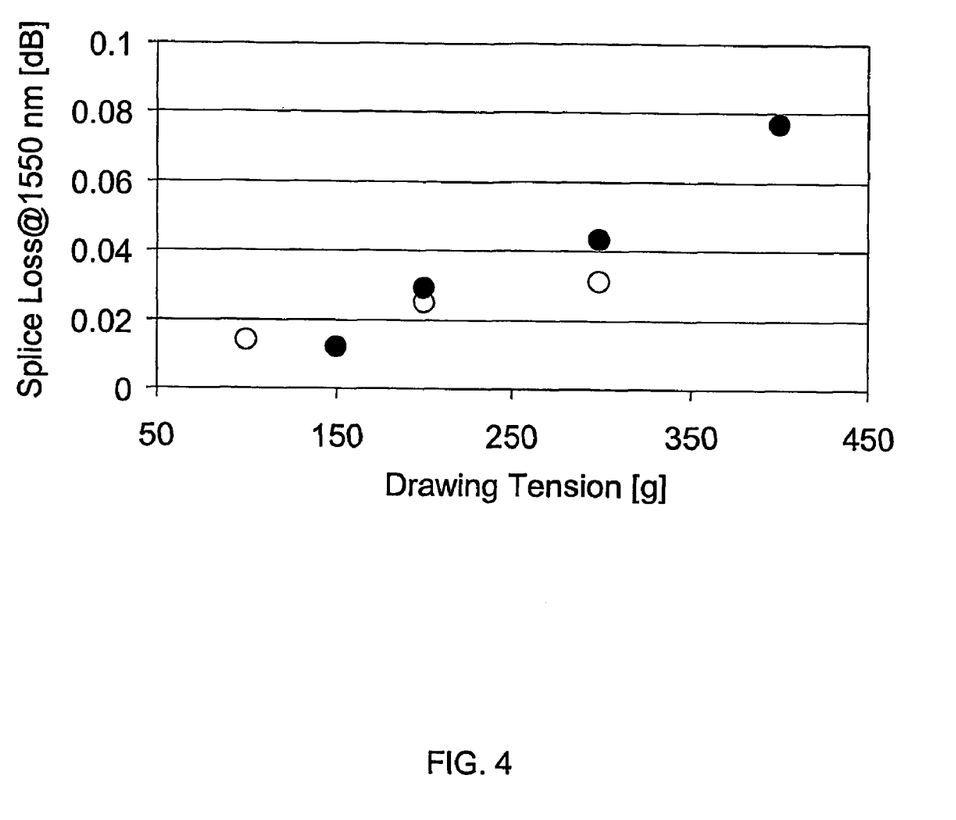
FIG. 4 is a graph showing the splice loss at 1550 nm as a function of the drawing tension for homogeneous splicing of optical fibres of FIG. 2 and of optical fibres of FIG. 3.

FIG. 4 is a graph showing the dependence of the splice loss, which was measured at 1550 nm, on the drawing tension for two types of NZD fibres. Values were obtained by averaging at least ten measurements of fibres spliced with themselves, i.e., homogeneous splicing. Furnace temperature and drawing tension were kept essentially constant during drawing. Drawing speed was 14 m/s. A profile alignment splicer of type FS 30 produced by Fujikura was employed to splice the fibres by optically aligning the fibre cores. Before splicing, fibres were stripped and then cleaned by dipping fibre ends in ultrasound alcohol bath. After cleaning, fibre ends were inserted into the splicer and cleaved with a cleavage angle of not more than one degree, by setting the cleave alarm threshold to 1 degree. Splice losses were measured at 1550 nm by bi-directional optical time domain reflectometry, taken from each end of the two fibres spliced together.

In FIG. 4, open circles indicate the values for a fibre having a RIP according to FIG. 2. Closed circles denote the values for a NZD fibre having a RIP as in the comparative example (FIG. 3). There is a remarkable reduction of the splice loss with decreasing of the drawing tension. The strong dependence of splice loss with drawing tension is visible for both types of fibres, despite their difference in RIP. However, fibres having a RIP of FIG. 3 which were drawn at tensions not larger than 250 g typically exhibited a relatively high attenuation, i.e., on average not less than 0.205 dB/km at 1550 nm. For example, a fibre with a RIP as in the comparative example and drawn at 150 g showed an attenuation of 0.215 dB/km at 1550 nm. Conversely, optical fibres according to the invention showed low attenuation when drawn at tensions not larger than 150 g. For example, an optical fibre having a RIP of the type shown in FIG. 2 with $\Delta_0\%$ of 0.65% and drawn at a tension of 90 g exhibited an attenuation of 0.195 dB/km at 1550 nm.

As shown in FIG. 4, tensions of 200 g or less yield splice losses, for homogeneous splicing, of not more than 0.03 dB. Splice losses of less than 0.02 dB are obtained for tension not exceeding the value of about 150 g.

Table 9 reports experimental measurements of the average splice loss measured at 1550 nm for splicing of different types of NZD fibres. For comparison, measurements of the average splice loss of commercial LEAF® fibres are given. LEAF® fibres were randomly selected on a fibre population in which the MFD varied between 9.5 and 9.9 μm, core/clad concentricity was on average 0.19 μm, having a maximum value of 0.32 μm, and curl was of 40 m on average, having a minimum value of 11 m.

Figure 5:
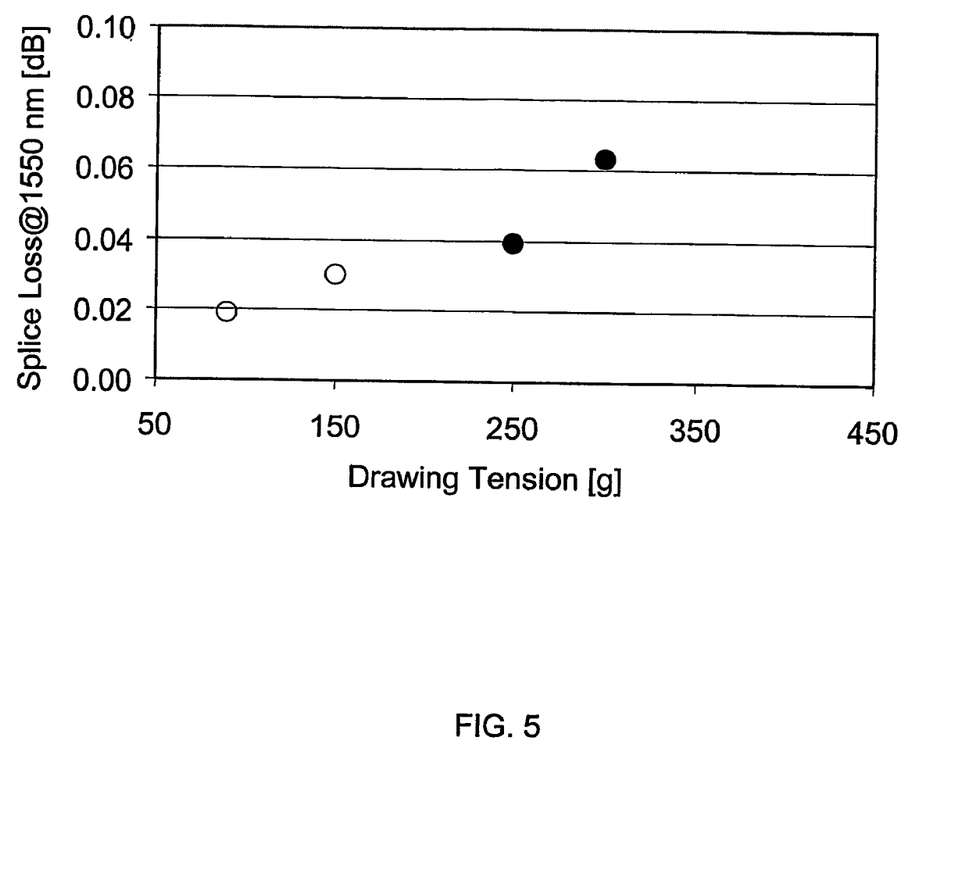
FIG. 5 is a graph showing the splice loss at 1550 nm as a function of the drawing tension for hybrid splicing of different optical fibres of FIG. 2 and of optical fibres of FIG. 3.

FIG. 5 is a graph showing the splice loss at 1550 nm vs. drawing tension for hybrid splicing of NZD fibres of the group of profiles in accord with FIG. 2 (open circles) and NZD fibres having a RIP in accord with FIG. 3 (closed circles). Splice losses not larger than 0.03 dB are achieved for fibres drawn at tensions not larger than 150 g.

The invention claimed is:

1. A method for manufacturing a non-zero dispersion optical fibre comprising the steps of:
   forming a glass preform from which an optical fibre can be drawn, the preform having a core and an outer cladding surrounding the core;
   heating a region of the preform to permit drawing an optical fibre therefrom; and
   drawing the preform into the optical fibre by applying a drawing tension to the heated region of the preform, the tension being not greater than 150 g,
   wherein the drawn optical fibre comprises a central segment, a first annular segment, a second annular segment, an inner cladding segment, and an outer cladding segment, arranged in a sequence in a radial direction of the optical fibre, the central segment having a maximum refractive index percent difference $\Delta_0\%$, the first annular segment having a maximum refractive index percent difference $\Delta_1\%$, the second annular segment having a maximum refractive index percent difference $\Delta_2\%$, the inner cladding segment having a maximum refractive index percent difference $\Delta_3\%$, each of the maximum refractive index percent differences $\Delta_0\%$, $\Delta_1\%$, $\Delta_2\%$, and $\Delta_3\%$ being defined with respect to the outer cladding segment, and
   wherein $\Delta_0\% > \Delta_2\% > \Delta_1\% \geq 0$ and $\Delta_2\% > \Delta_3\% \geq 0$, where $\Delta_0\%$ is between 0.64% and 0.80%, and the second annular segment has a centre radius $r_2$ in the range of 5.5 to 7.5 μm, and a width $w_2$ in the range of 1.7 to 3.0 μm.

TABLE 9

| Fibre type | Number of splices | Tension (g) | Average splice loss (dB) | Standard deviation | Minimum (dB) | Maximum (dB) |
|---|---|---|---|---|---|---|
| NZD-A | 43 | 90 | 0.019 | 0.011 | 0.002 | 0.051 |
| NZD-B | 60 | 150 | 0.030 | 0.014 | 0.004 | 0.058 |
| NZD-C | 142 | 250 | 0.038 | 0.016 | 0.005 | 0.106 |
| LEAF ® | 214 | — | 0.040 | 0.022 | 0.002 | 0.128 |

NZD-A and NZD-B fibres had an index profile shape illustrated in FIG. 2, drawn at tensions of 90 g and 150 g, respectively. 43 splices were made between randomly elected NZD-A fibres having a RIP in accordance to FIG. 2 and the optical parameters within the ranges reported in Table 1. 60 splices were made between randomly selected NZD-B fibres having a RIP in accordance with FIG. 2 and optical parameters within the ranges reported in Table 1. The average curl value of the NZD-A fibre was 28 m and its average core/cladding concentricity was of 0.24 μm. The average curl value of the NZD-B fibre was 24 m and its average core/cladding concentricity was of 0.29 μm.

The NZD-C fibres had a RIP compliant to that shown in FIG. 3. Splices were carried out between NZD-C fibres, which had been randomly selected from a population of fibres having the optical parameters within the ranges given in Table 8. The NZD-C fibres were drawn at a tension of 250 g. Results of Table 3 clearly show that the average splice loss decreases with decreasing the drawing tension.

2. The method of claim 1, wherein $r_2$ is within the range of 6.7 to 7.5 μm.

3. The method of claim 1, wherein the second annular segment has a $\Delta_2\%$ in the range of 0.11% to 0.17%.

4. The method of claim 1, wherein the drawing tension is not more than 100 g.

5. The method of claim 4, wherein the drawing tension is between 60 and 100 g.

6. The method of claim 4, wherein $\Delta_0\%$ is between 0.64% and 0.73%.

7. The method of claim 4, wherein $r_2$ is within the range of 7.1 to 7.5 μm.

8. The method of claim 1, wherein the optical fibre is drawn at a speed in the range of 9 to 16 m/s.

9. The method of claim 1, wherein the index profile of the second annular segment has a shape obtained using a super-Gaussian type function $$\Delta_2\% \cdot \exp\left(-\frac{1}{2}\left|\frac{r-r_2}{\sigma_2}\right|^\alpha\right)$$

with α in the range of 4 to 7.

10. The method of claim 1, wherein the width of the central segment is in the range of 3.5 to 4.3 μm.

11. The method of claim 1, wherein the maximum relative index of the inner cladding segment, $\Delta_3\%$, is from 0.02% to 0.04%.

12. The method of claim 11, wherein $\Delta_3\%$ is from 0.021% to 0.027%.

* * * * *